United States Patent
Pantelides et al.

(10) Patent No.: US 9,720,422 B2
(45) Date of Patent: Aug. 1, 2017

(54) SYSTEM FOR FLUID PROCESSING NETWORKS

(71) Applicant: PROCESS SYSTEMS ENTERPRISE LIMITED, London, Greater London (GB)

(72) Inventors: Constantinos Christou Pantelides, London (GB); Ying Sheng Cheng, Cambridge (GB); James Ingram Marriott, London (GB)

(73) Assignee: Process Systems Enterprise Limited, London, Greater London (GB)

( * ) Notice: Subject to any disclaimer, the term of this patent is extended or adjusted under 35 U.S.C. 154(b) by 420 days.

(21) Appl. No.: 14/371,962

(22) PCT Filed: Jan. 10, 2013

(86) PCT No.: PCT/GB2013/050038
§ 371 (c)(1),
(2) Date: Jul. 11, 2014

(87) PCT Pub. No.: WO2013/104905
PCT Pub. Date: Jul. 18, 2013

(65) Prior Publication Data
US 2015/0025695 A1    Jan. 22, 2015
US 2015/0309514 A9    Oct. 29, 2015

(30) Foreign Application Priority Data

Jan. 13, 2012 (GB) .................................. 1200547.6
Jan. 13, 2012 (GB) .................................. 1200580.7

(51) Int. Cl.
*G05D 9/00* (2006.01)
*G01H 3/00* (2006.01)
(Continued)

(52) U.S. Cl.
CPC ....... *G05D 7/0617* (2013.01); *G05B 23/0243* (2013.01)

(58) Field of Classification Search
None
See application file for complete search history.

(56) References Cited

U.S. PATENT DOCUMENTS 4,676,313 A * 6/1987 Rinaldi ............... E21B 43/12
166/250.15
5,186,150 A * 2/1993 Sekine ............... F02D 41/187
123/494

(Continued)

FOREIGN PATENT DOCUMENTS

EP             2302479 A2    3/2011

*Primary Examiner* — Adam Lee
(74) *Attorney, Agent, or Firm* — Gable Gotwals

(57) ABSTRACT

This invention relates to a method of monitoring a fluid processing network having a plurality of fluid processing regions including the steps of: receiving measured current parameter values at known points of the network; determining from the measured current parameter values regions of the network that are active, all other regions being deemed inactive; subtracting inactive regions of the network from a model of the fluid processing network to provide a current active network model; determining current parameter values of the current active network at least at points remote from the known points, the parameter values at said remote points being determined using the measured current parameter values and the current active network model; based on the current parameter values, determining if one or more pre-specified boundaries are breached; and performing a predetermined action if one or more said boundaries are breached.

17 Claims, 10 Drawing Sheets

(51) Int. Cl.
*G06G 7/50* (2006.01)
*G05D 7/06* (2006.01)
*G05B 23/02* (2006.01)

(56) References Cited

U.S. PATENT DOCUMENTS

| | | | | |
|---|---|---|---|---|
| 5,453,944 A | * | 9/1995 | Baumoel | G01F 1/668 700/281 |
| 5,992,519 A | * | 11/1999 | Ramakrishnan | E21B 43/00 166/250.01 |
| 6,012,015 A | * | 1/2000 | Tubel | E21B 41/0035 702/6 |
| 6,389,881 B1 | * | 5/2002 | Yang | G01M 3/243 73/40.5 A |
| 6,601,458 B1 | * | 8/2003 | Gysling | G01F 1/74 73/861.04 |
| 7,418,354 B1 | * | 8/2008 | Greenlee | G01M 3/2807 702/51 |
| 7,542,885 B1 | * | 6/2009 | Majumdar | G06F 17/5018 700/83 |
| 8,749,393 B1 | * | 6/2014 | Tollefson | G01M 3/2876 137/460 |
| 2001/0038243 A1 | * | 11/2001 | Isono | B60K 6/365 303/116.1 |
| 2003/0033117 A1 | * | 2/2003 | Sage | G06F 17/5004 702/182 |
| 2003/0066359 A1 | * | 4/2003 | Gysling | G01F 1/74 73/861.23 |
| 2005/0246112 A1 | * | 11/2005 | Abhulimen | F17D 5/02 702/51 |
| 2007/0179766 A1 | * | 8/2007 | Cullick | E21B 43/00 703/10 |
| 2007/0204635 A1 | * | 9/2007 | Tanaka | F25B 13/00 62/129 |
| 2007/0209865 A1 | * | 9/2007 | Kokosalakis | H04B 13/00 181/0.5 |
| 2007/0271077 A1 | * | 11/2007 | Kosmala | E21B 43/00 703/5 |
| 2008/0009978 A1 | * | 1/2008 | Smirnov | G05D 7/0635 700/282 |
| 2008/0147361 A1 | | 6/2008 | Miller | |
| 2009/0299714 A1 | * | 12/2009 | Kelkar | E21B 47/06 703/10 |
| 2009/0312964 A1 | * | 12/2009 | Najim Al-Khamis | E21B 43/34 702/50 |
| 2010/0057237 A1 | * | 3/2010 | Kettaneh | G05B 19/41885 700/103 |
| 2010/0169251 A1 | | 7/2010 | Cole et al. | |
| 2010/0305882 A1 | * | 12/2010 | Gysling | G01F 1/7082 702/47 |
| 2010/0312502 A1 | * | 12/2010 | Alonso | F17D 5/06 702/51 |
| 2010/0313958 A1 | * | 12/2010 | Patel | E03B 7/071 137/1 |
| 2012/0007743 A1 | * | 1/2012 | Solomon | G01M 3/243 340/605 |
| 2013/0046527 A1 | * | 2/2013 | Ono | G06F 17/5009 703/9 |
| 2014/0052421 A1 | * | 2/2014 | Allen | G05B 17/02 703/2 |

\* cited by examiner

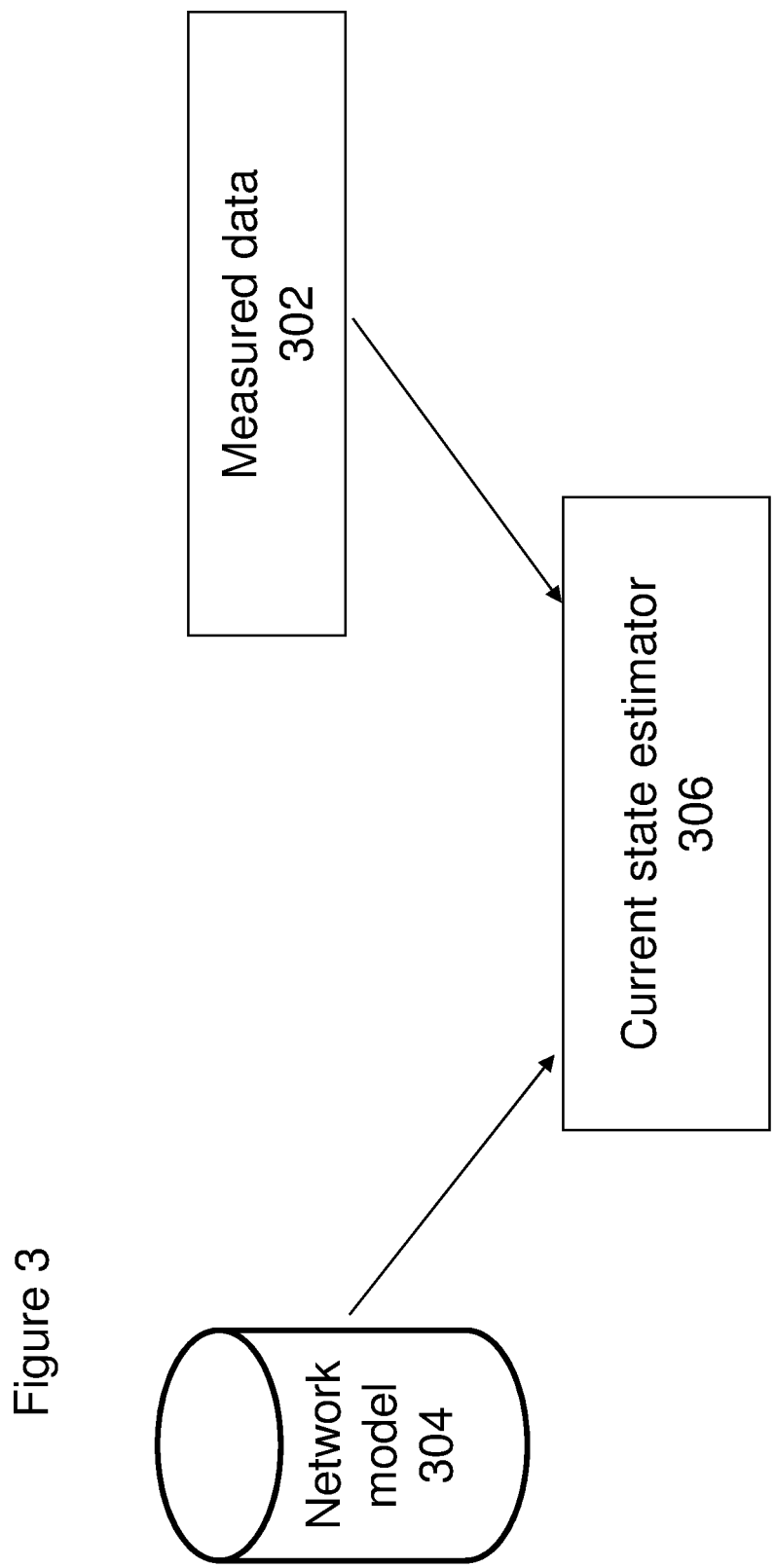

SYSTEM FOR FLUID PROCESSING NETWORKS

CROSS-REFERENCE TO RELATED APPLICATIONS

This application is the United States National Phase of PCT Patent Application No. PCT/GB2013/050038 filed on 10 Jan. 2013, which claims priority to British Patent Applications No. 1200547.6 filed 13 Jan. 2012 and No. 1200580.7 filed 13 Jan. 2012, each of which are incorporated herein by reference.

FIELD OF THE INVENTION

The present invention relates to systems for monitoring and/or control of fluid processing networks.

BACKGROUND OF THE INVENTION

Networks for processing of fluids, such as in an oil production facility, an oil refinery or a chemical plant, are made up of a large number of component parts including, without limitation, a large number of valves, pipe segments and fluid chambers, with fluid flowing into and through the components of the network. Such processing networks may be provided with safety features, for example fluid release networks such as flare networks, aiming to maintain pressure within the network or within a part of the fluid processing network at or below a safety limit.

A fluid release network may be a sub-network of a fluid processing network and is also made up of a large number of component parts including, without limitation, a large number of pipe segments, valves and fluid chambers, with fluid flowing into and through the components of the network for the primary purpose of removing such fluid from the processing network to a safe place, including without limitation venting or flaring to atmosphere.

The fluid processing network may be provided with sensors including, without limitation, fluid pressure sensors, fluid temperature sensors and metal wall temperature sensors. However these sensors can only measure property values at the specific point where the sensors are located, leaving areas of unknown pressure and/or temperature between the measurement points.

SUMMARY OF THE INVENTION

In a first aspect the invention provides a method of monitoring a fluid processing network comprising a plurality of fluid processing regions, the method comprising the steps of:
receiving measured current parameter values at known points of the network;
determining from the measured current parameter values regions of the network that are active, all other regions being deemed inactive;
subtracting inactive regions of the network from a model of the fluid processing network to provide a current active network model;
determining current parameter values of the current active network at least at points remote from the known points, the parameter values at said remote points being determined using the measured current parameter values and the current active network model;
based on the current parameter values, determining if one or more pre-specified boundaries are breached; and
performing a predetermined action if one or more said boundaries are breached.

Optionally, the current active network model is periodically updated using periodically received updates of the measured current parameter values.

Optionally, inactive regions that have become active, or active regions that have become inactive, are determined from the updates of the measured current parameter values.

Optionally, the measured current parameter values, the determined current parameter values and the pre-specified parameter boundaries are selected from fluid pressure, fluid temperature, pipe and/or vessel wall temperature, fluid flow rate, and level of liquid in a vessel.

Optionally, the parameter boundaries include predetermined constant boundaries.

Optionally, the parameter boundaries include variable boundaries or mathematical constraints derived from the values of one or more parameters.

Optionally, at least one predetermined risk is associated with a given parameter being outside a parameter boundary.

Optionally, predetermined risks include a pipe fracture risk, a pipe blockage risk and an explosion risk.

Optionally, the predetermined action is selected from one or more of: issuing a notification to a network operator and issuing an instruction to an automated network control system.

Optionally, the notification includes identification of a risk associated with said current parameter values breaching one or more boundaries.

Optionally, current parameter values are determined for known points of the current active network for which measured parameter values are received.

Optionally, measured current parameter values for known points are replaced with the corresponding determined current parameter values for the same points in a manner that is consistent with the model of the fluid processing network.

Optionally, the current active network model includes values of settings of the network based on received values of settings of the network.

Optionally, the values of settings of the network include values of valve settings of the network.

Optionally, one or more of the pre-specified boundaries apply to respective one or more pre-specified points of the network.

Optionally, the network is a flare network.

In a second aspect the invention provides computer program code which when run on a computer causes the computer to perform the method according to the first aspect.

In a third aspect the invention provides a carrier medium carrying computer readable code which when run on a computer causes the computer to perform the method according to the first aspect.

In a fourth aspect the invention provides a computer program product comprising computer readable code according to the third aspect.

In a fifth aspect the invention provides an article of manufacture comprising: a machine-readable storage medium; and executable program instructions embodied in the machine readable storage medium that when executed by a programmable system causes the system to perform the method according to the first aspect.

In a sixth aspect the invention provides a method of monitoring a fluid processing network formed from a plurality of fluid processing components, each fluid processing component being associated with one or more predetermined component models, the method comprising:

receiving measured current parameter values at known points of the network;

generating a model of the fluid processing network from a selection of the predetermined component models;

determining current parameter values of the network at least at points remote from the known points, the parameter values at said remote points being determined using the measured current parameter values and the network model;

determining if a current parameter value breaches one or more predetermined boundaries; and performing a predetermined action if one or more of said boundaries are breached, wherein one or more of the fluid processing components of the network are each associated with two or more predetermined component models; and wherein for each component that is associated with two or more predetermined component models, one of the said two or more predetermined component models is selected for use in generating the model of the fluid processing network depending on conditions of the fluid processing network.

Optionally according to the sixth aspect the conditions of the fluid processing network determining the component model for a particular component used in generating the model of the fluid processing network are selected from: one or more current parameter values of the network; one or more anticipated future parameter values of the network; and the presence of one or more chemical species in the fluid processing network.

Optionally according to the sixth aspect one or more components of the network are associated with at least one component model that is used in generating a model for all conditions of the fluid processing network.

Optionally according to the sixth aspect the model is modified in response to a change in a condition of the fluid processing network that causes a change in the selection of component model used in generating the model.

Optionally according to the sixth aspect the measured current parameter values, the determined current parameter values and the predetermined parameter boundaries are selected from fluid pressure, fluid temperature, pipe and/or vessel wall temperature, fluid flow rate, and level of liquid in a vessel.

Optionally according to the sixth aspect the parameter boundaries include predetermined constant boundaries.

Optionally according to the sixth aspect the parameter boundaries include variable boundaries or mathematical constraints derived from the values of one or more parameters.

Optionally according to the sixth aspect one or more of the predetermined boundaries apply to respective one or more pre-specified points of the network.

Optionally according to the sixth aspect at least one predetermined risk is associated with a given parameter breaching a parameter boundary.

Optionally according to the sixth aspect predetermined risks include a pipe fracture risk, a pipe blockage risk and an explosion risk.

Optionally according to the sixth aspect the predetermined action is selected from one or more of: issuing a notification to a network operator and issuing an instruction to an automated network control system.

Optionally according to the sixth aspect the notification includes identification of a risk associated with said current parameter values breaching one or more boundaries.

Optionally according to the sixth aspect current parameter values are determined for known points of the network for which measured parameter values are received.

Optionally according to the sixth aspect measured current parameter values for known points are replaced with the corresponding determined current parameter values for the same points in a manner that is consistent with the model of the fluid processing network.

Optionally according to the sixth aspect the network model includes values of settings of the network based on received values of settings of the network.

Optionally according to the sixth aspect the values of settings of the network include values of valve settings of the network.

Optionally according to the sixth aspect the plurality of fluid processing components include pipe segments, valves and fluid chambers.

Optionally according to the sixth aspect the network is a flare network.

In a seventh aspect the invention provides computer program code which when run on a computer causes the computer to perform the method according to the sixth aspect.

In an eighth aspect the invention provides a carrier medium carrying computer readable code which when run on a computer causes the computer to perform the method according to the seventh aspect.

In a ninth aspect the invention provides a computer program product comprising computer readable code according to the eighth aspect.

In a tenth aspect the invention provides an article of manufacture comprising: a machine-readable storage medium; and executable program instructions embodied in the machine readable storage medium that when executed by a programmable system causes the system to perform the method according to the sixth aspect.

In an eleventh aspect the invention provides a method of monitoring a fluid processing network, the method comprising the steps of:

receiving measured current parameter values at known points of the network;

determining current parameter values at least at points remote from the known points, the parameter values at said remote points being determined by application of the measured parameter values to a model of the network;

selecting one or more risks to be analysed from a group of predetermined risks, each predetermined risk being associated with one or more points of the network, for each selected risk, determining if a risk at the one or more associated points of the network exceeds a predetermined acceptable risk limit for that risk at one or more of those points; and performing a predetermined action if a risk exceeds a predetermined acceptable risk limit, wherein a risk is selected for analysis if a current parameter at the one or more points associated with the risk meets a predetermined risk selection requirement.

Optionally according to the eleventh aspect, one or more of the group of predetermined risks is not selected for analysis.

Optionally according to the eleventh aspect, each predetermined risk defines at least one parameter boundary that should not be breached.

Optionally according to the eleventh aspect, the measured current parameter values, the boundaries and the determined current parameter values and the predetermined parameter boundaries are selected from fluid pressure, fluid temperature, pipe and/or vessel wall temperature, fluid flow rate, and level of liquid in a vessel.

Optionally according to the eleventh aspect, the parameter boundaries include variable boundaries or mathematical constraints derived from the values of one or more parameters.

Optionally according to the eleventh aspect, the predetermined action is selected from one or more of: issuing a notification to a network operator and issuing an instruction to an automated network control system.

Optionally according to the eleventh aspect, the notification includes identification of the risk limit that has been exceeded.

Optionally according to the eleventh aspect, predetermined risks include a pipe fracture risk, a pipe blockage risk and an explosion risk.

Optionally according to the eleventh aspect, current parameter values are determined for known points of the current active network for which measured parameter values are received.

Optionally according to the eleventh aspect, measured current parameter values for known points are replaced with the corresponding determined current parameter values for the same points in a manner that is consistent with the model of the fluid processing network.

Optionally according to the eleventh aspect, the current network model includes values of settings of the network based on received values of settings of the network.

Optionally according to the eleventh aspect, the values of settings of the network include values of valve settings of the network.

Optionally according to the eleventh aspect, the network is a flare network.

In a twelfth aspect the invention provides computer program code which when run on a computer causes the computer to perform the method according to the eleventh aspect.

In a thirteenth aspect the invention provides a carrier medium carrying computer readable code which when run on a computer causes the computer to perform the method according to the eleventh aspect.

In a fourteenth aspect the invention provides a computer program product comprising computer readable code according to the thirteenth aspect.

In a fifteenth aspect the invention provides an article of manufacture comprising: a machine-readable storage medium; and executable program instructions embodied in the machine readable storage medium that when executed by a programmable system causes the system to perform the method according to the eleventh aspect.

In a sixteenth aspect the invention provides a method of monitoring a fluid processing network, the method comprising the steps of:
receiving measured current parameter values at known points of the network;
receiving values of settings of the network;
determining current parameter values at least at points remote from the known points, the parameter values at said remote points being determined by application of the measured parameter values to a model of the network;
predicting parameter values at a future point in time if a predetermined change is made to the settings of the network, or if no change is made to the settings of the network; and performing a predetermined action if the predetermined change, or if no change, is determined to have the effect of causing one or more of the predicted parameter values to breach a predetermined parameter boundary.

Optionally according to the sixteenth aspect, the values of settings of the network comprise values of valve settings of the network.

Optionally according to the sixteenth aspect, the measured current parameter values, the determined current parameter values and the predetermined parameter boundaries are selected from fluid pressure, fluid temperature, pipe and/or vessel wall temperature, fluid flow rate, and level of liquid in a vessel.

Optionally according to the sixteenth aspect, the parameter boundaries include predetermined constant boundaries.

Optionally according to the sixteenth aspect, the parameter boundaries include variable boundaries or mathematical constraints derived from the values of one or more parameters.

Optionally according to the sixteenth aspect, at least one predetermined risk is associated with a given parameter being outside a parameter boundary.

Optionally according to the sixteenth aspect, predetermined risks include a pipe fracture risk, a pipe blockage risk and an explosion risk.

Optionally according to the sixteenth aspect, the predetermined action is selected from one or more of: issuing a notification to a network operator and issuing an instruction to an automated network control system.

Optionally according to the sixteenth aspect, the notification includes identification of a risk associated with said current parameter values breaching one or more boundaries.

Optionally according to the sixteenth aspect, current parameter values are determined for known points of the current network for which measured parameter values are received.

Optionally according to the sixteenth aspect, measured current parameter values for known points are replaced with the corresponding determined current parameter values for the same points in a manner that is consistent with the model of the fluid processing network.

Optionally according to the sixteenth aspect, the current active network model includes values of settings of the network based on received values of settings of the network.

Optionally according to the sixteenth aspect, the values of settings of the network include values of valve settings of the network.

Optionally according to the sixteenth aspect, one or more of the pre-specified boundaries apply to respective one or more pre-specified points of the network.

Optionally according to the sixteenth aspect, the network is a flare network.

In a seventeenth aspect the invention provides computer program code which when run on a computer causes the computer to perform the method according to the sixteenth aspect.

In an eighteenth aspect the invention provides computer readable code which when run on a computer causes the computer to perform the method according to the sixteenth aspect.

In a nineteenth aspect the invention provides a computer program product comprising computer readable code according to the eighteenth aspect.

In a twentieth aspect the invention provides an article of manufacture comprising: a machine-readable storage medium; and executable program instructions embodied in the machine readable storage medium that when executed by a programmable system causes the system to perform the method according to the sixteenth aspect.

In a twenty first aspect the invention provides a method of monitoring a fluid release sub-network of a fluid processing network, the method comprising:

receiving measured current parameter values at known points of the sub-network;

determining current parameter values of the sub-network at least at points remote from the known points, the parameter values at said remote points being determined using the measured current parameter values and the current active network model;

based on the current parameter values, determining if one or more pre-specified boundaries are breached; and performing a predetermined action if one or more said boundaries are breached.

Optionally according to the twenty first aspect the fluid release sub-network is a flare network.

Optionally according to the twenty first aspect the measured current parameter values, the determined current parameter values and the pre-specified parameter boundaries are selected from fluid pressure, fluid temperature, pipe and/or vessel wall temperature, fluid flow rate, and level of liquid in a vessel.

Optionally according to the twenty first aspect the parameter boundaries include predetermined constant boundaries.

Optionally according to the twenty first aspect the parameter boundaries include variable boundaries or mathematical constraints derived from the involving the values of one or more parameters Optionally according to the twenty first aspect at least one predetermined risk is associated with a given parameter being outside a parameter boundary.

Optionally according to the twenty first aspect predetermined risks include a pipe fracture risk, a pipe blockage risk and an explosion risk.

Optionally according to the twenty first aspect the predetermined action is selected from one or more of: issuing a notification to a network operator and issuing an instruction to an automated network control system.

Optionally according to the twenty first aspect the notification includes identification of a risk associated with said current parameter values breaching one or more boundaries.

Optionally according to the twenty first aspect current parameter values are determined for known points of the sub-network for which measured parameter values are received.

Optionally according to the twenty first aspect measured current parameter values for known points are replaced with the corresponding determined current parameter values for the same points in a manner that is consistent with the model of the fluid processing network.

Optionally according to the twenty first aspect the sub-network model includes values of settings of the network based on received values of settings of the sub-network.

Optionally according to the twenty first aspect the values of settings of the sub-network include values of valve settings of the network.

Optionally according to the twenty first aspect one or more of the predetermined boundaries apply to respective one or more predetermined points of the network In a twenty second aspect the invention provides computer program code which when run on a computer causes the computer to perform the method according to the twenty first aspect.

In a twenty third aspect the invention provides a carrier medium carrying computer readable code which when run on a computer causes the computer to perform the method according to the twenty first aspect.

In a twenty fourth aspect the invention provides a computer program product comprising computer readable code according to the twenty third aspect.

In a twenty fifth aspect the invention provides an article of manufacture comprising: a machine-readable storage medium; and executable program instructions embodied in the machine readable storage medium that when executed by a programmable system causes the system to perform the method according to the twenty first aspect.

In particular embodiments of the invention relate to methods and apparatus for online monitoring of fluid networks and other systems or plant. In this context "online" means the monitoring system modelling the fluid network is connected to the operating fluid network, system or plant so as to be able to take measurements and data in real time and model the network, system or plant in real time or faster than real-time.

DESCRIPTION OF THE DRAWINGS

The invention will now be described in more detail with reference to the Figures, in which:

FIG. 3 illustrates apparatus for implementing an embodiment of the invention;

DETAILED DESCRIPTION OF THE INVENTION

Figure 1A:
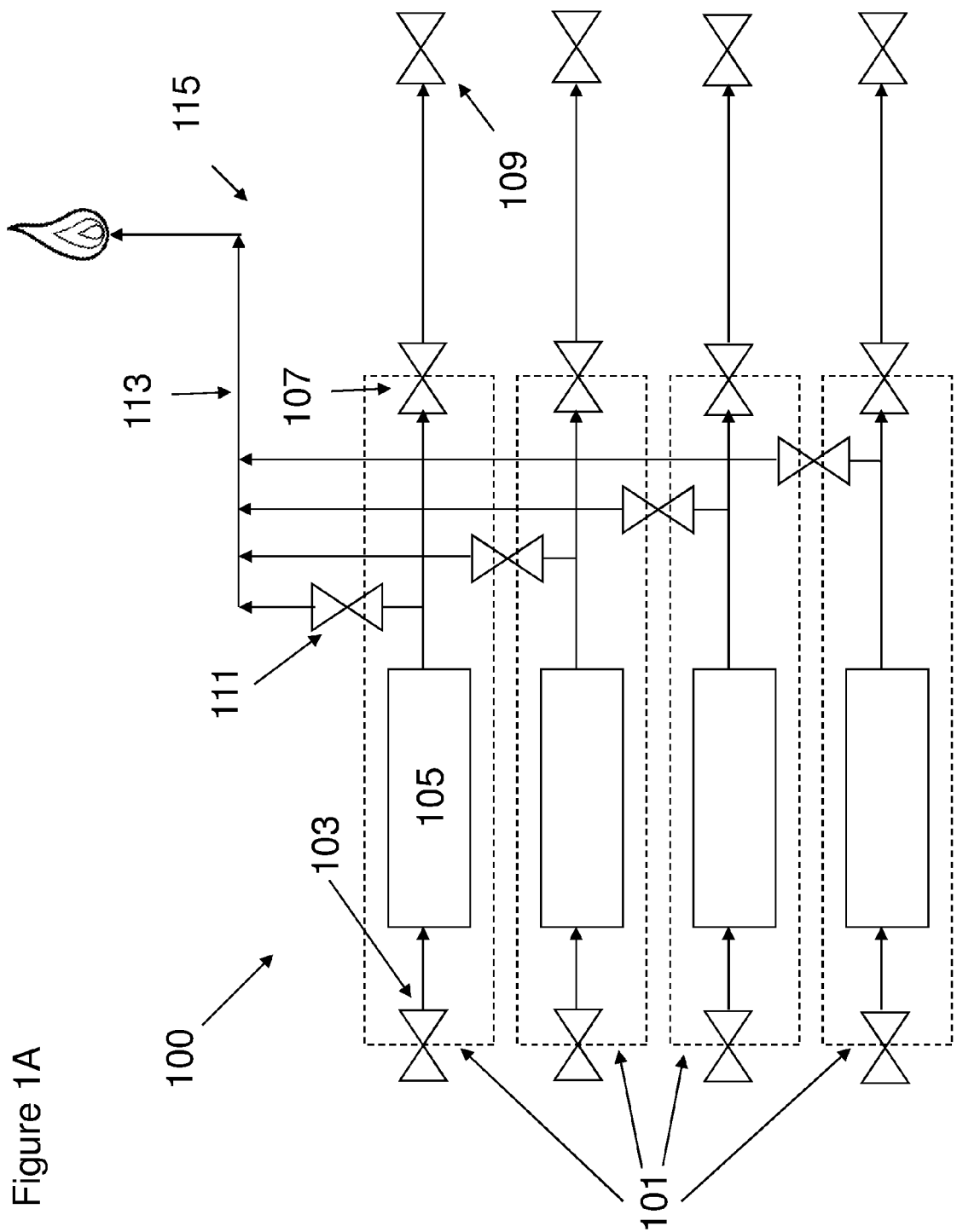
FIG. 1A illustrates an exemplary fluid processing network including flare network.
Figure 1B:
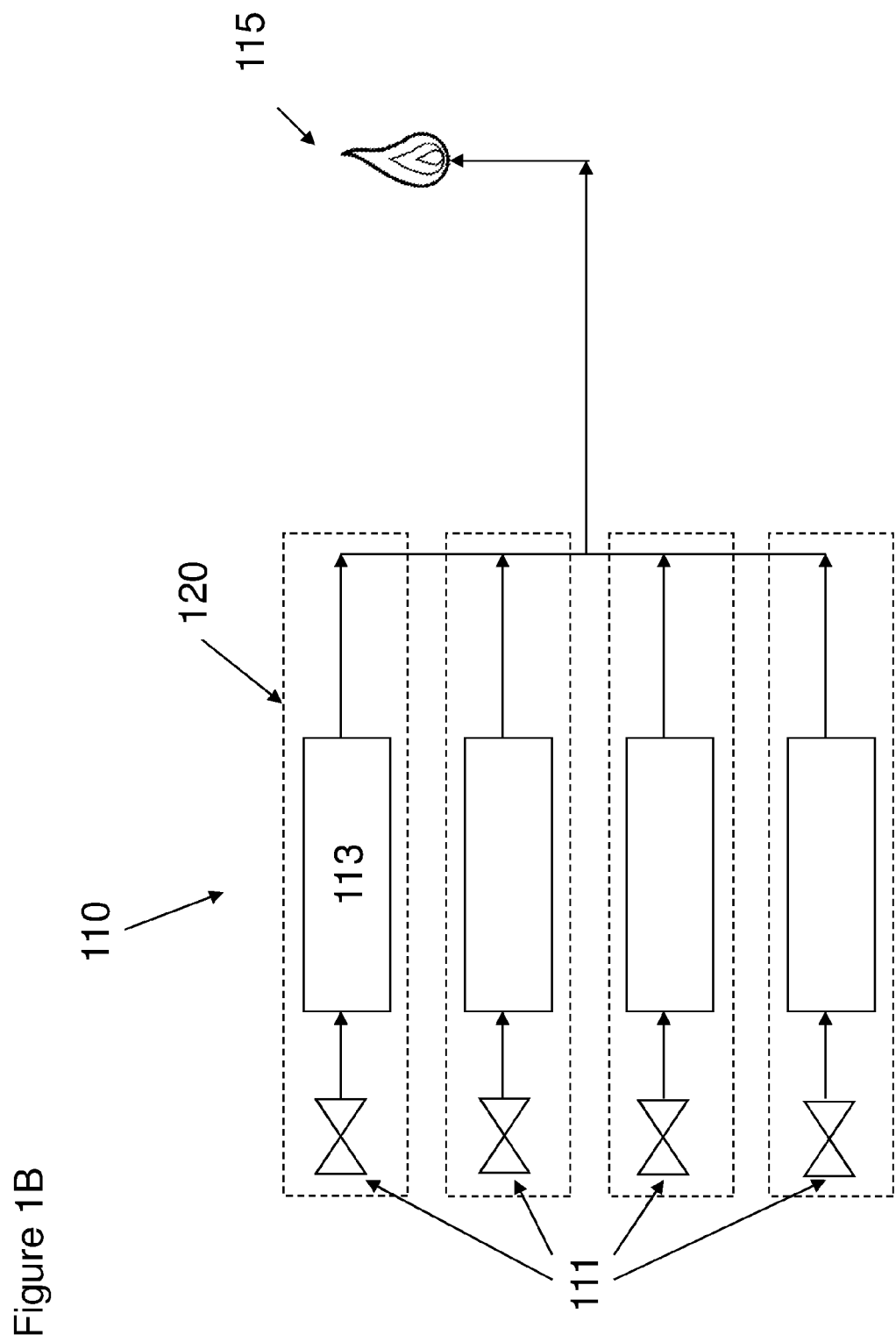
FIG. 1B illustrates an exemplary flare network.

With reference to FIG. 1A, a fluid processing network 100 may contain a plurality of regions 101. Each region may have at least one fluid inlet for inlet of fluid into a chamber 105, for example an inlet valve 103, and at least one fluid outlet for outlet of fluid out of the chamber, for example an outlet valve 107. Each region may be provided with a path for outlet of fluid from the network after the fluid has been processed, for example a valve 109. Each region 101 may be connected to a safety outlet, for example a valve 111, for outlet of fluid from the network through a fluid release sub-network before, during or after processing of the fluid in order to relieve pressure within a region 101 if pressure within the region breaches a predetermined safety level. With reference to FIG. 1B, the outlet path for each region may lead to a region 120 of a flare network 110 comprising pipework and one or more headers 113 leading to one or more flare stacks 115 for ignition of the fluid.

Sensors (not shown), for example fluid pressure sensors and/or fluid temperature sensors, may be distributed throughout the fluid processing network, including the fluid release sub-network.

Different regions 101 may be provided for different functions, and different fluids may be present in different regions 101. For example, an oil refinery network may contain a fractional distillation region providing a plurality of different fractions of crude oil, each fraction being supplied to a different region or regions of the network for different treatments depending on the end product to be produced from each fraction. Exemplary treatments for each fraction include, without limitation, hydrogenation, alkylation and catalytic cracking. An oil platform may have areas for high-pressure, medium-pressure and low-pressure separation of oil and gas.

The fluid in each region may be in a liquid state or a gaseous state, and/or a combination of liquid and gas, and the state may vary over time.

In order to ensure that pressure does not reach a dangerous level in areas where fluid property values are not directly measured, the fluid processing network may be modelled in order to determine such property values.

Figure 2:
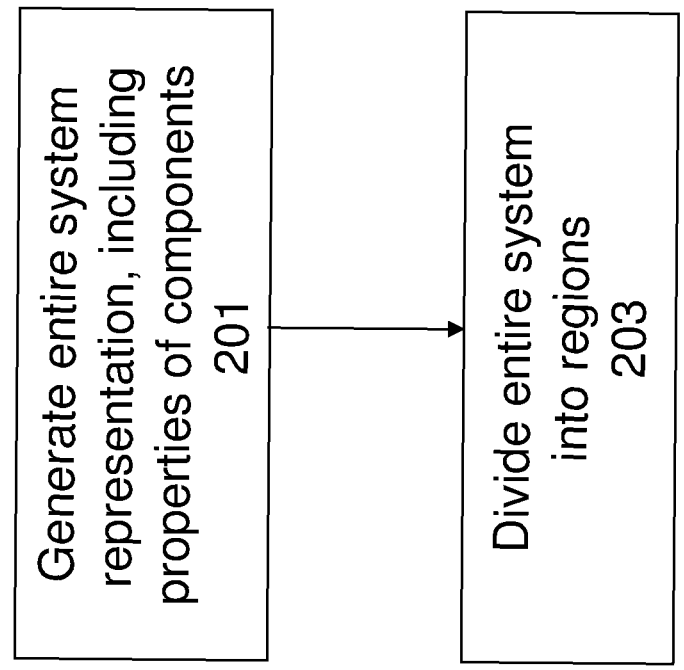
FIG. 2 illustrates a process for modelling a network, for example a flare network.

With reference to FIG. 2, in a first step 201 a model of the flare network 110 may be prepared by determining each component "building block" of the flare network and the connectivity of different components. Exemplary components include, without limitation, pipe segments, valves, chambers and flares. The representation may include properties of each component including, without limitation, the material that each component is made of; one or more dimensions of pipe segments and chambers such as pipe segment diameter, length and wall thickness; and properties such as wall roughness.

The model may be a set of mathematical relationships including a plurality of parameters of the network that vary over time (e.g. pressure, temperature) and describe the behaviour of the network over time. The model may be generated from sets of: algebraic equations; ordinary differential equations; ordinary differential and algebraic equations; integral and partial differential and ordinary differential equations and algebraic equations. Exemplary models may be as implemented in commercially available gPROMS® software or MATLAB® software, and the like.

The network is deemed to be operating in a safe and efficient manner provided the values of the model's parameters remain within pre-specified boundaries which may define a safe range for one or more parameters or combination of parameters for operation of the network, and/or boundary values for efficient operation of the network, for example boundary values that will avoid breakdown of all or part of the network and/or excessive utilisation of raw materials and energy. Parameter boundaries may be determined during design of the fluid processing network based on safety standards, recommended practice and considerations of material-of-construction properties.

Exemplary parameters for which boundaries may be specified include, without limitation, one or more of:
 (i) fluid pressure boundaries;
 (ii) fluid flow rate boundaries;
 (iii) fluid temperature boundaries; and
 (iv) metal wall temperature boundaries for any component parts including, without limitation, pipe segments, valves and fluid chambers.

The boundaries of a network may include pre-determined constant boundaries, for example a constant associated with a property of a component of the network, and each component of the network may have one or more pre-determined constant boundaries associated with it. These pre-determined constant boundaries may be incorporated into the model of the flare network 110 generated at step 201.

The boundaries of a network may include variable boundaries. Variable boundaries may vary over time depending on the function of the network and/or materials present within the network at a given time. These variable boundaries may not be incorporated into the model generated at step 201, but may be generated in real time depending on the application and condition of the network at a given time.

Boundaries may be specified for example in terms of:
 (a) numerical lower and/or upper limits on the value of a certain parameter; for example, the temperature $T_F$ of the fluid inside a pipe segment may have to be kept above a certain temperature limit $T_L$ at all times in order to avoid the risk of brittle fracture of the pipe; in this case, $T_F$ is a model parameter, the value of which varies over time while, for a given material of construction of the pipe, $T_L$ is a known constant (e.g. approximately −46° C. for certain types of carbon steel suitable for low-temperature applications);
 (b) relationships between the values of two or more parameters; for example, in order to avoid the risk of blockage caused by the formation of solid hydrates or solid ice in a pipe segment carrying fluid that contains water, the temperature, $T_F$, of the fluid inside it must always stay above the hydrate and ice formation temperatures, $T_H$ and $T_I$ respectively. Accordingly, boundaries in this case may be defined in terms of mathematical inequality constraints of the form $T_F > T_H$ and $T_F > T_I$. All three of these temperatures, $T_F$, $T_H$ and $T_I$, are parameters, the values of which vary over time depending on the changing nature of the fluid composition and pressure as determined by the solution of the model.

Each boundary may be associated with one or more risks. For example, in the case of safety boundaries an explosion or rupture risk may be associated with the fluid pressure within the network breaching a boundary fluid pressure value, and a fracture risk may be associated with a pipe temperature within the network falling below a minimum pipe temperature.

A risk may be determined to exist as soon as a boundary has been breached, or if a boundary remains breached for a predetermined period of time.

The representation of the entire network may be divided at step 203 into a plurality of regions, for example regions 101 as described with reference to FIG. 1, or regions 120 in the case where the flare network 110 only is modelled. Each region may have a different functionality.

A given boundary may be a universal boundary applicable to a network as a whole, for example a whole flare network 110 or may be different for two or more different regions, for example regions 120 of flare network 110. Exemplary universal boundary values include a universal maximum pressure and a universal maximum Mach number.

Each region, for example a region associated with a specific fluid processing operation, may independently be divided into sub-regions with different boundaries for different sub-regions. For example, a pipe may be made from a number of segments that differ in one or more of material or thickness, resulting in a different pressure and/or temperature boundary for different sub-regions. A boundary may apply to a single component of the network or a sub-region containing a combination of components of the network.

With reference to FIG. 3, a current state estimator 306 is configured to receive the network model from a database 304 storing the model generated as described in FIG. 2, including a representation of the network and boundary values. The current state estimator 306 is further configured to receive data 302 from measurements made by sensors in the network. The data 302 may be applied to the network model 304 to determine real-time values of the parameters of the network, such as current temperatures and pressures within the network, at points remote from the measurement points, as described in more detail with reference to FIGS. 4A-4D. The current state estimator 306 may also analyse data 302 from measurement points and correct any inconsistencies in these data, for example due to inaccurate readings. In a first step, the current state estimator 306 may determine if data received from a measurement point are inaccurate based on the network model and on measurements from other measurement points and determine a more accurate value for that point to be used in place of the measured value. If the measured parameter values are not mutually consistent (according to the physical laws embedded in the model) then they may be replaced by the corresponding determined current parameter values such that parameter values throughout the network are mutually consistent. Accordingly, the current state estimator 306 may determine accurate values for parameters throughout the network, including at measurement points.

It will be understood that method steps described in embodiments herein may be implemented as routines in computer program code running on a computer processor or as equivalent specialized circuits for data processing. Indeed such a system may be implemented in a computer architecture capable of running multiple processes in parallel, as will be described hereinafter with reference to FIG. 6.

Figure 4A:
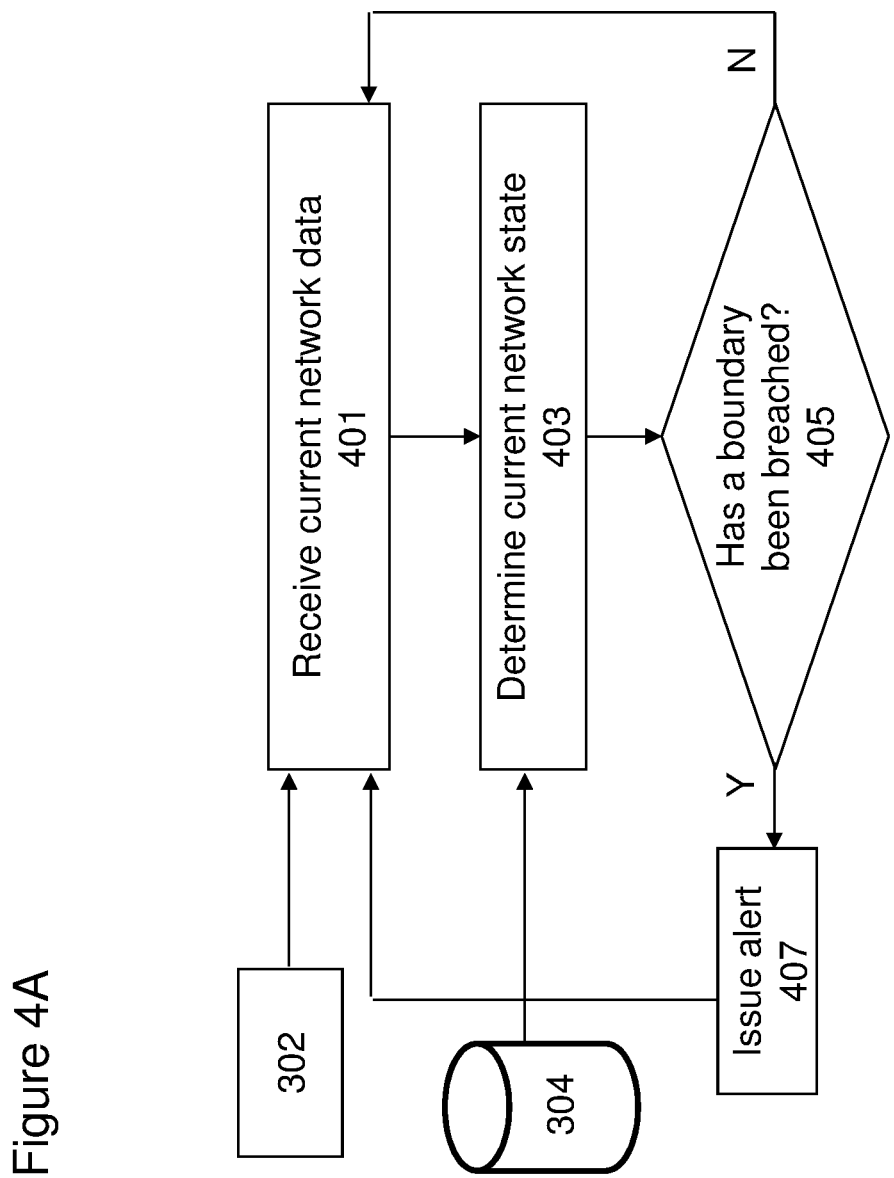
FIG. 4A illustrates a first process for determining if a boundary has been breached according to an embodiment of the invention.

FIG. 4A illustrates a process for a data processing system configured to determine the state of a flare network 110 during operation. In use, embodiments of the invention provide real-time monitoring of fluid networks.

The system is configured to receive at step 401 current network data 302. The data 302 may include one or more of: data from measurements made by sensors in the flare network 110, for example pressures and temperatures from fluid pressure sensors and/or fluid temperature sensors; and fluid flow rate data, which may be directly measured fluid flow rate data or data on the extent to which inlet valves 111 of the network 110 are open, from which flow rates may be determined using established engineering techniques. The current network data 302 includes not only data of the measured parameter but also the point in the network at which the parameter was measured.

The data 302 only allows determination of whether a boundary value has been breached at the points of the network from which the data has been taken.

At step 403, the system is configured to combine the received measured data with the network model stored in database 304 in order to determine a current network state, including parameters such as fluid pressure values and/or fluid temperature values both at the points at which direct measurements have been made and at points remote from those direct measurement points. This is achieved via the solution of a state estimation problem applied to the underlying set of mathematical equations in the model and based on an appropriate algorithm including, without limitation, extended Kalman Filters, Particle Filtering and others. The state estimation problem and methods for its solution are described in more detail in, for example, S. Simon, *Optimal State Estimation: Kalman, Hinf and Nonlinear Approaches*, Wiley Interscience, 2006.

The current parameter values of the network may be checked at step 405 against boundaries, stored in database 304 or another database, to determine if a boundary has been breached. The stored boundaries may be stored in a separate risk database (not shown). The risk database may include the identity of a model parameter or combination of model parameters associated with a risk, and the lower and upper limits of the value of this parameter which determine whether a message alerting the operator needs to be issued, and the severity of this message (e.g. "for information", "warning", "severe warning" etc.). If a boundary has been breached, then an alert may be issued to a system user at step 407. The alert may contain one or more of: an alert as to the boundary that has been breached; a message indicating a risk associated with breaching this boundary; severity of the risk; and recommendations for remedial action.

If the network is automated, or certain safety systems of the network are automated, then the system may be configured to send an instruction to the automated network control system to take the relevant remedial action. For example, a valve may be automatically opened in order to relieve a dangerous build up of pressure.

The current network data 302 may be periodically updated, and the parameter values of the current network state determined at step 403 may be periodically updated based on the updated current network data in order that the current network state determined by the system is representative of the real-time state of the network.

Referring again to FIG. 1B, one or more regions 120 of flare network 110 may be inactive during operation of the network. For example, fluid may be flowing into or through one or more regions 120 and no fluid may be flowing in one or more other regions 120.

The data processing system may be configured to analyse only the active regions of the network, and exclude inactive regions from the model. By "active region" as used herein is meant a region into or through which fluid is flowing at or above a predetermined flow rate minimum, or has been flowing within a predetermined period of time, or where other parameters (for example, metal wall temperatures) are still changing over time as a result of relatively recent flow of material through the region. By "inactive region" as used herein is meant a region into or through which fluid is not flowing at or above the predetermined flow rate minimum, and has not been flowing at or above the predetermined flow rate minimum for at least a predetermined period, or where other parameters are not changing with time. The flow rate minimum may be, but is not necessarily, a flow rate of zero.

Figure 4B:
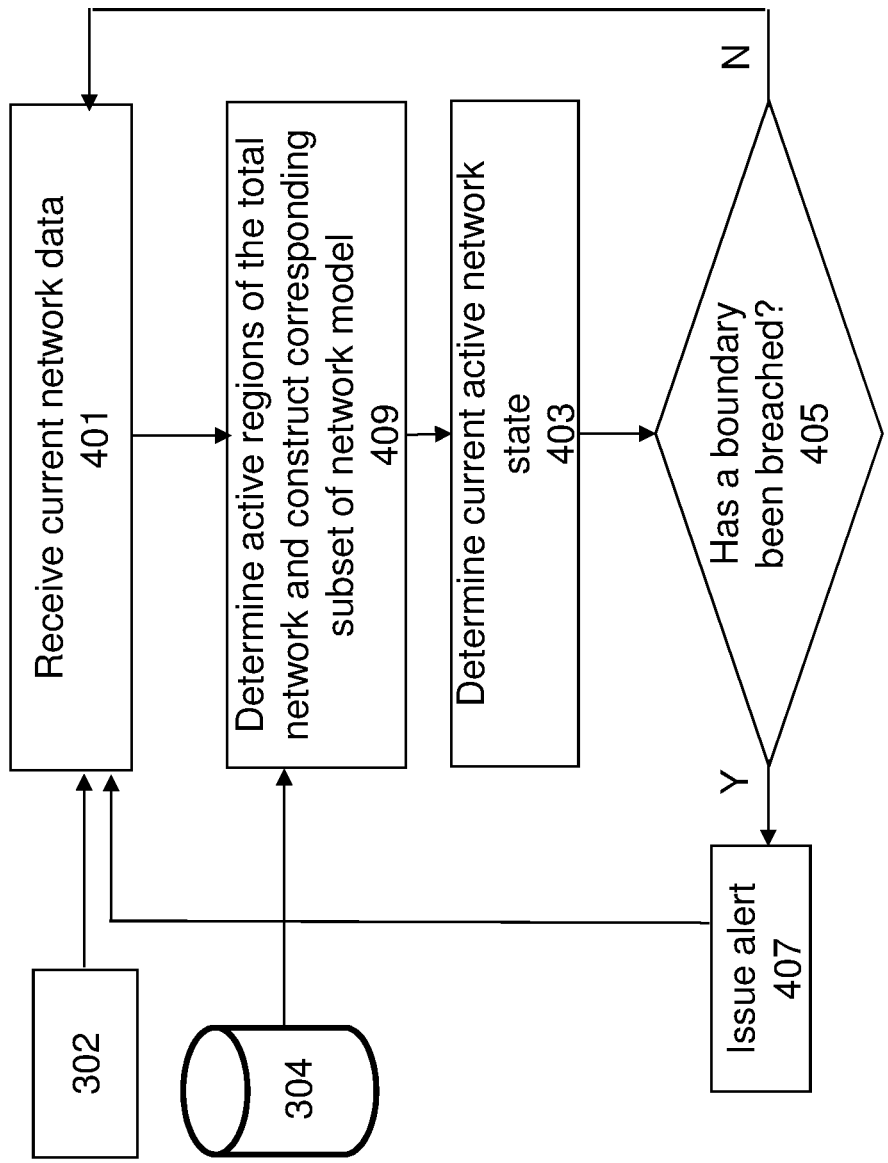
FIG. 4B illustrates a second process for determining if a boundary has been breached according to an embodiment of the invention.

With reference to FIG. 4B, the system may be configured to carry out steps similar to those of FIG. 4A except that current network data 302 may be analysed at step 409 to determine currently active regions of the total network model stored in database 304, for example by tracing and modelling all possible flow paths emanating from valves that are currently open or valves that have recently been open and terminating at a flare stack. Regions which are not deemed to be active may be excluded from the model of the total network to give a model of the currently active network, and the current network state determined at step 403 may be done only for the currently active network.

The active or inactive state of any given region may change over time, and the data processing system may be configured to periodically re-analyse the current network data 302 to determine if any region has changed from active to inactive, or from inactive to active. In this way, the currently active network determined at step 409 and the current network state of the current active network generated at step 403 may be periodically updated in real time so as to remain representative at all times of the current state of the network.

Note that certain embodiments according to the invention may be able to automatically track and redefine active regions of the network and include them in the computation, for example by using a code routine that monitors predetermined valves of the network between their open and closed states. Such a code routine may execute from time to time or in response to a trigger, in order to update and/or redefine active regions to be included in the analysis.

By generating a model that includes only the active regions for analysis, greater computational efficiency may be achieved and, the model may be more robust than a model including regions in which the values of parameters representing fluid flowrates may be at or close to zero.

The total number of risks monitored and potentially identified by the system may be very large. For example, a pipe may become brittle if it remains at below a first minimum boundary pipe temperature for at least a time T1 (for example due to the Joule-Thomson effect), and so a first risk associated with pipe temperature may be a fracture risk. A predetermined acceptable pipe fracture risk limit may be exceeded if a measured or determined pipe temperature falls below a predetermined minimum pipe temperature boundary, or if a pipe temperature remains below a predetermined minimum pipe temperature boundary for more than a predetermined maximum time.

Furthermore, if a gas flowing through the pipe contains water vapour, then there may be a second risk of ice and/or other solids such as hydrates forming within the pipe at temperatures below the minimum boundary value, which may ultimately result in blockage of the pipe. A predetermined acceptable ice blockage risk limit may be exceeded if water vapour is flowing through a pipe and if a measured or determined pipe temperature falls below a predetermined minimum pipe temperature boundary, or if a pipe temperature remains below a predetermined minimum pipe temperature boundary for more than a predetermined maximum time during flow of water vapour through the pipe.

Figure 4C:
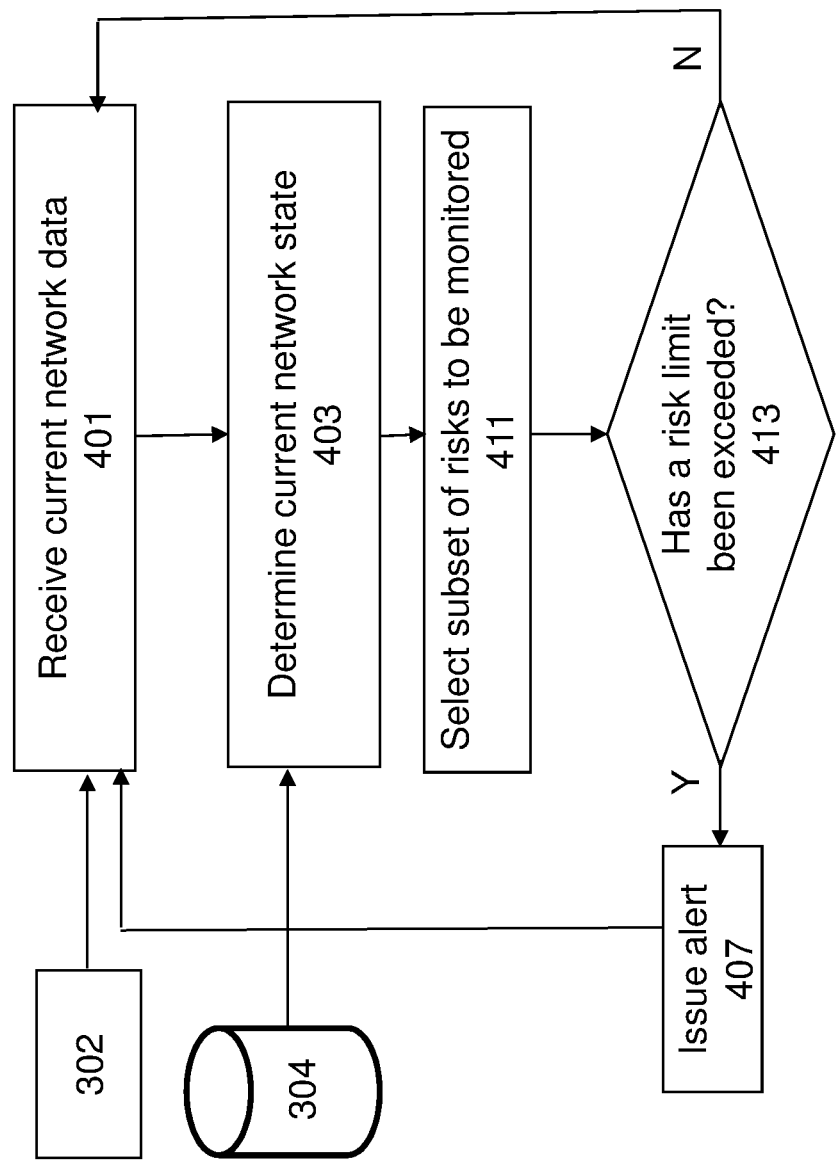
FIG. 4C illustrates a third process for determining if a boundary has been breached according to an embodiment of the invention.

With reference to FIG. 4C, database 304 containing the network model contains all predetermined risks and acceptable risk limits. In another embodiment, a separate risk database may contain all predetermined risks and acceptable risk limits. Each entry in this database may comprise one or more items of information including, but not limited to, the identity of the model parameter associated with the risk, the lower and upper limits of the value of this parameter which determine whether a message alerting the operator needs to be issued, and the severity of this message (e.g. "for information", "warning", "severe warning" etc.). The data processing system may be configured to select all or a subset of the predetermined acceptable risk limits for analysis to determine if one or more acceptable risk limits has been exceeded at steps 411 and 413.

Each risk to be analysed may be associated with a selection requirement which may be based on parameter values from the current network state determined at step 403. For example, with reference again to the example risk of ice forming within a pipe segment, the system may be configured not to monitor the ice formation risk within a pipe or pipes of a particular region if the measured or determined temperature of the pipe or pipes in that region is above a predetermined level, and/or if no water vapour is present in the pipe or pipes of that region.

The degree of detail that needs to be incorporated within the model may depend on the risks that are to be monitored. For example, a model of a pipe segment that is capable of predicting the potential formation of ice may be more complex than one that can predict only the temperature and pressure within the pipe. The model database 304 may contain multiple models of the same component (such as pipe segments or vessels), each such model having different degrees of detail. For example, in the case of a component representing a pipe segment, the model database may contain three distinct models: the simplest model may comprise only a description of the relation between the fluid flowrate in the pipe and the pressure drop within the pipe; a model of intermediate complexity may additionally include a description of the variation of temperature in the wall of the pipe along the length of the pipe, together with descriptions of the heat transfer between the wall and the fluid in the pipe and between the wall and the surrounding atmosphere; finally, the most detailed model may additionally include a description of the potential formation of solids within the pipe at very low temperatures. The system may then automatically select a model of the appropriate degree of detail for each and every component of the network that is consistent with the risks that are selected to be analysed in constructing a model of the overall network. The selection may be made via the evaluation of pre-specified logical conditions involving the current values of the parameters in the network. In the example of the pipe segment mentioned above, the system may switch from the simplest model to the intermediate complexity model if the temperature $T_F$ of the fluid in the pipe drops to within a pre-specified margin of the temperature $T_B$ of brittle fracture of the material of construction of the pipe; $T_F$ is a parameter that is computed by the current state estimator 403, and its value will generally change over time, while $T_B$ is a known constant. Furthermore, the system may be configured to switch to the most detailed model if the differences between the temperature $T_F$ of the fluid in the pipe and the temperatures of potential ice or hydrate formation, $T_I$ and $T_H$ respectively, are smaller than pre-specified margins; both $T_I$ and $T_H$ are time-varying parameters that are computed by the current state estimator 403. Moreover, the choice of an appropriate model for each component may be periodically changed as and when required throughout the operation of the system, such changes triggering a real-time re-configuration of the overall network model.

The system may be configured to monitor certain risks regardless of the current network state determined at step 403. For example, the system may be configured to always monitor risks that may have a severe safety impact, for example an explosion risk, as opposed to risk limits associated with risks that may impact only the efficiency of the network.

By selecting the risks to be analysed and re-configuring the model in the manner described above, the processing time and/or processing power required by the system may be reduced with little or no reduction in the effectiveness of the system.

Figure 4D:
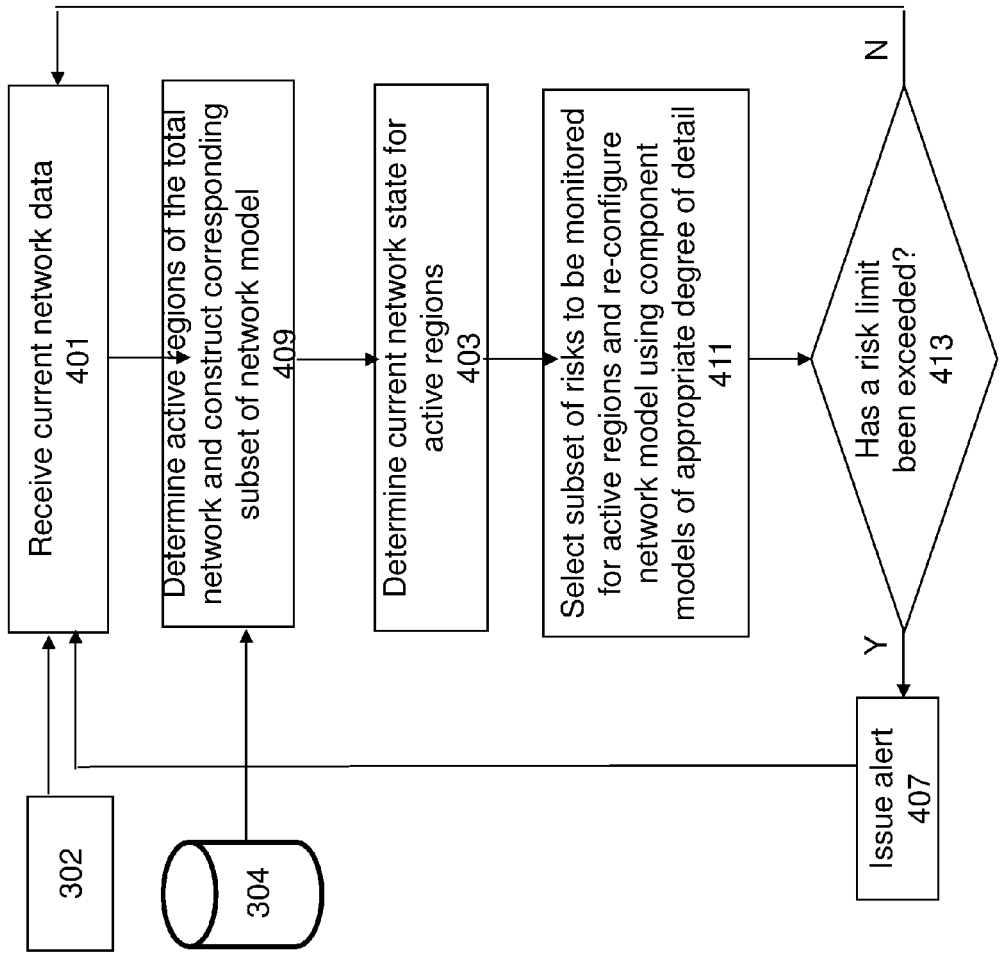
FIG. 4D illustrates a fourth process for determining if a boundary has been breached according to an embodiment of the invention.

FIG. 4D illustrates a combination of FIGS. 4B and 4C, wherein inactive regions are determined at step 409 and are omitted from the network model as described in FIG. 4B, a subset of the risks to be monitored are selected as described in FIG. 4C, and the network model is automatically re-configured to incorporate component models of an appropriate degree of detail. If regions of the network are determined to be inactive, thereby resulting in a more compact network model, then this may allow for more risks to be selected to be monitored using more detailed component models than if no determination of inactive regions is made.

The data processing system described with reference to FIGS. 4A-4D is configured to react when the current state of the network has breached one or more pre-specified boundaries. The data processing system may be further configured to determine if the network is likely to breach one or more boundaries at some future time, should certain hypothetical events take place.

Figure 5:
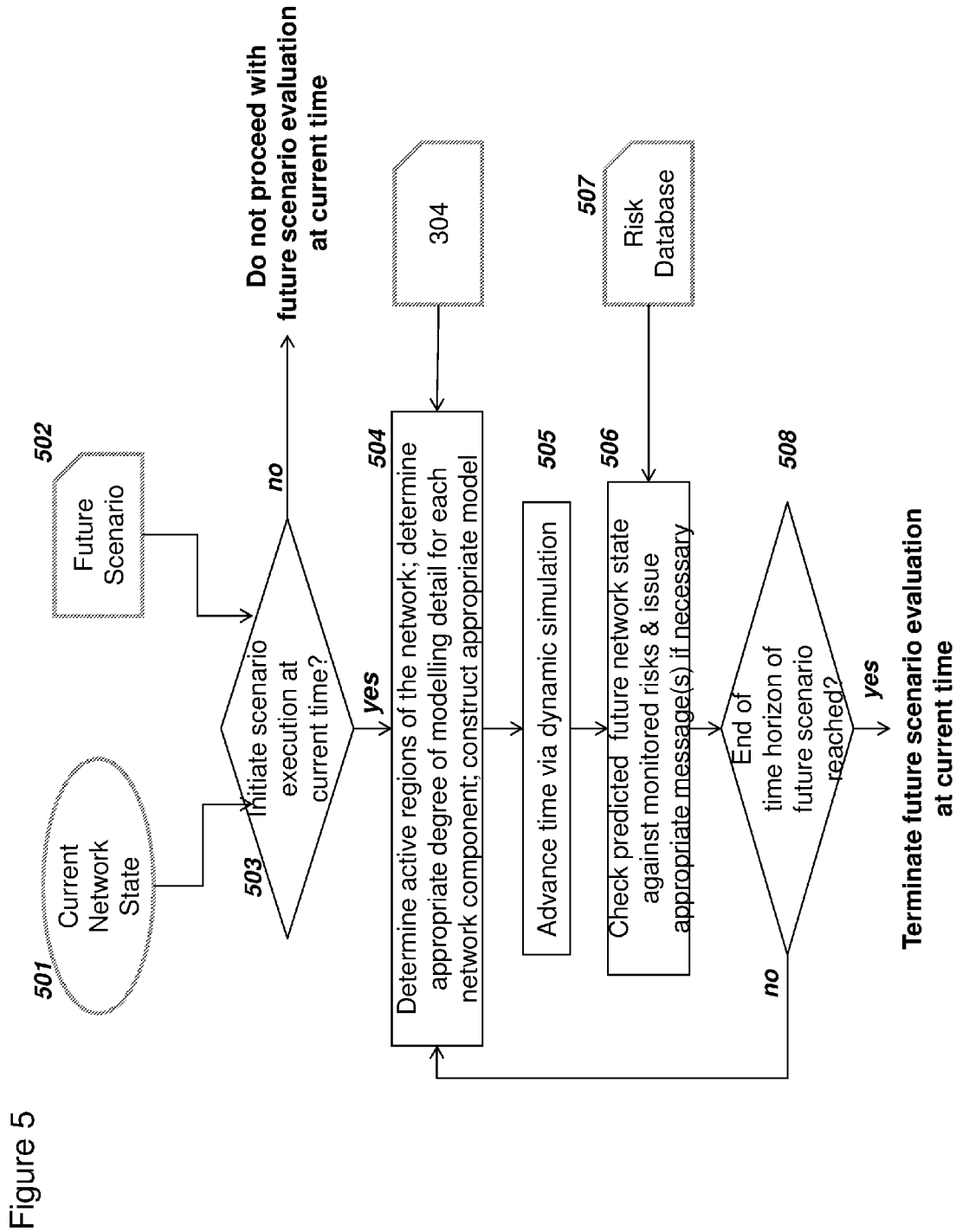
FIG. 5 illustrates a process of determining if a future scenario will cause a boundary to be breached.

FIG. 5 illustrates the manner in which the system may execute one future scenario starting from the current state 501 of the network as determined at step 403 described above with reference to FIGS. 4A-4D. The definition of a future scenario 502 comprises items of information including but not limited to the conditions under which the scenario needs to be considered, the time horizon of interest to the scenario (e.g. a certain number of minutes starting from the current time), and the variation of zero or more inputs to the network (e.g. flowrates entering through one or more of the valves 111 in FIG. 1B) over this time horizon. For example, a future scenario may determine the effects of opening some valves 111 which are currently closed, and/or of closing of some of the valves which are currently open, and/or of variations in the flowrates or other properties (e.g. composition and/or temperature) of the material received through valves which are currently open. The number of such additional inputs may be zero, in which case the future scenario will simply determine how the network state will evolve over time from its current condition if no changes are made to network settings. At step 503, the system determines whether the future scenario is to be evaluated at the current time. The definition of a future scenario may specify that it must be executed at pre-specified, usually regular, time intervals (e.g. every 10 minutes) and/or whenever one or more criteria (expressed in terms of logical conditions involving the current values of one or more of the system parameters) hold true. For example, a future scenario relating to a hypothetical event that may potentially cause the network to exceed its capacity may need to be considered only if the system is currently operating near its capacity, albeit still under it.

At step 503, the system may also proceed with the evaluation of a future scenario following an explicit request issued by external agents such as, for example, authorised human operators or other computer programmes. Such a future scenario may either be entirely pre-defined or be partially or fully configured by the external agent prior to its execution. This functionality allows the system to act as a decision support tool, for example providing advance knowledge of the effects of a proposed set of actions on the network's future behaviour.

Assuming that step 503 determines that the future scenario is to be evaluated, then step 504 determines the set of active regions that need to be considered given the current state of the network and the additional network inputs stipulated by the future scenario. Using the model database 304, this step may also construct an appropriate subset of the network model describing these active regions as described in step 409 in FIGS. 4B and 4D. In doing so, and by applying appropriate criteria to the predicted state of the network, the system may also determine the appropriate degree of modelling detail to be applied to the modelling of each component in the network as described in step 411 in FIG. 4D.

Using the model constructed at step 504, a future scenario evaluator is configured at step 505 to perform a dynamic simulation to advance time over a pre-specified time interval, taking account of the time varying inputs to the network as specified in the definition of the future scenario, and predicting the state of the network at the end of this time interval. Then at step 506 the future scenario evaluator assesses this predicted state against the database of risks 507 and issues appropriate alert messages should one or more boundaries be breached. Each such message may comprise several items of information, including, but not limited to, an identification of the future scenario being evaluated, the future time (e.g. relative to the current time) at which the breach is predicted to take place, and the identities and values of the parameter(s) involved in this breach.

Finally, at step 508 the future scenario evaluator checks whether the end of the time horizon of interest for the future scenario being evaluated has been reached. If this is the case, the execution of the scenario terminates, otherwise the algorithm is repeated from step 504.

The system may be configured to consider for evaluation one or more future scenarios using one or more respective future scenario evaluators operating concurrently or sequentially, such consideration taking place at regular time intervals during the network's operation. Analysis of each future scenario may be conducted concurrently or sequentially on the same processor, or analysis may be divided between a plurality of processors. Optionally, each future scenario has a dedicated processor running a dedicated future scenario evaluator.

Figure 6:
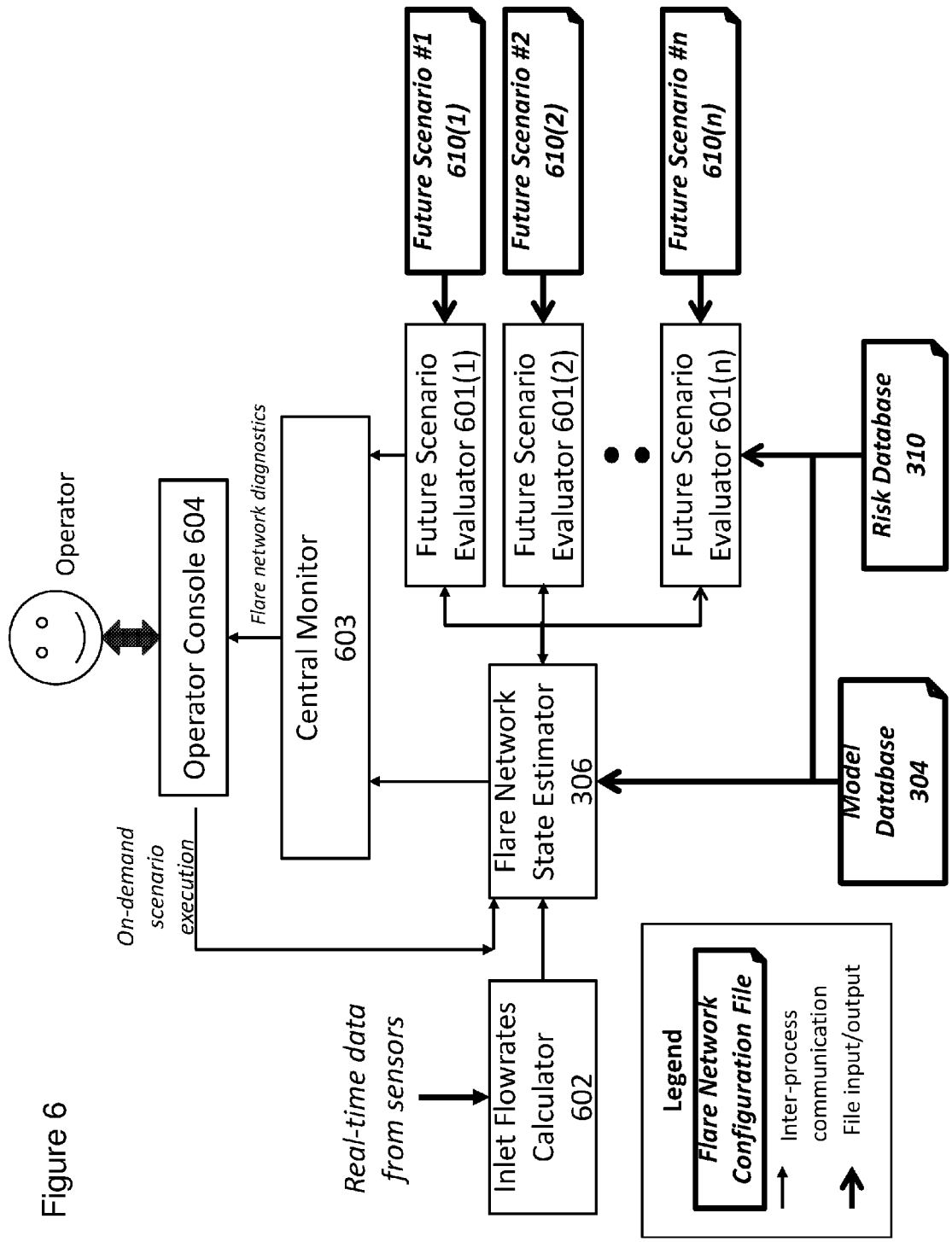
FIG. 6 illustrates a system according to an embodiment of the invention.

FIG. 6 illustrates an embodiment of the system as described herein, illustrating both monitoring of the current state of a flare network and evaluating the effect of a number n of future scenarios on the flare network.

The system comprises computational components 306, 601, 602, 603, 604 implemented as general computer code which is independent of the particular flare network to which is system is being applied. A separate instantiation of the future scenario evaluator component is executed for each future scenario under consideration. Each computational component may be implemented as a separate computer program. Different components may be executed on the same or on different computer processors, communicating with each other using well-established inter-process communication protocols such as the Message Passing Interface (MPI) or Parallel Virtual Machine (PVM) protocols.

The flare network and the desired behaviour of the system when applied to it are defined entirely in terms of the configuration files 304, 310 and 610. A separate future scenario definition file 610 is provided for each future scenario under consideration. The complete separation between general computational components and network-specific configuration files facilitates the deployment and maintenance of the system.

During the operation of the system, real-time data are received from the sensors in the network. Some of these data are used by the Inlet Flowrates Calculator 602 to determine the inlet flowrates to the network if these are not already measured directly. The data, including the computed inlet flowrates, are then passed to the Flare Network State Estimator 306 which is a computer code implementation of the algorithm described in FIG. 4D, Any alerts issued are transmitted to the Central Monitor 603 which communicates them in an appropriate form to the Operator Console 604.

The Flare Network State Estimator 306 also communicates the current state of the system to the Future Scenario Evaluators 601, each of which is responsible for the execution of a different pre-defined future scenario 610. Each Future Scenario Evaluator 601 is a computer code implementation of the algorithm described in FIG. 5. Any alerts arising from the execution of the corresponding future scenario are transmitted to the Central Monitor 603 which then communicates them in an appropriate form to the Operator Console 604.

The system described herein may allow for accurate determination of: parameters such as temperature and pressure of fluid within the network; prediction of parameters at points in the future if changes are made or are not made; and determination of risks to efficiency and/or safety of the network.

As shown by the above description, at least some implementations of the invention as described herein may involve programming, for example, of a processor unit of one or more servers. Implementations that may involve programming include, without limitation: generating a model of a fluid processing network; determining parameters of the network by applying measured data to a model of the network; determining if a determined parameter exceeds a boundary; predicting the effect on a parameter if a change, or if no change is made to the settings of the system; determining if a predicted parameter exceeds a boundary; and taking a predetermined action if a determined or predicted parameter exceeds a boundary for that parameter, such as issuing an alert Program aspects of the technology may be thought of as "products" or "articles of manufacture" typically in the form of executable code and/or associated data that is carried on or embodied in a type of machine readable medium. "Storage" type media include any or all of the memory of the supporting electronics system, computing devices, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software.

Hence, a machine readable medium may take many forms, including but not limited to, a tangible non-transitory storage medium, a carrier wave medium or physical transmission medium. Tangible non-volatile storage media include, for example, optical or magnetic disks, such as any of the storage devices in any computer(s) or the like. Tangible volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Many of these forms of computer readable media may be involved in carrying one or more sequences of one or more instructions to a processor for execution.

The invention has been described herein primarily with reference to a fluid release networks, for example a flare network of a fluid processing network. However, it will be understood that the invention may be applied to any fluid processing network in order to, without limitation, generate a model of the fluid processing network; determine parameters of the fluid processing network by applying measured data to a model of the network; determining if a determined parameter exceeds a boundary; predicting the effect on a parameter if a change, or if no change is made to the settings of the system; determining if a predicted parameter exceeds a boundary; and taking a predetermined action if a determined or predicted parameter exceeds a boundary for that parameter, such as issuing an alert. Such alerts can be used for example as messages for human operators, as messages for general machine control interfaces, as safety alerts and/or alarms.

For example, the invention may be applied to an oil refinery which may have a fluid processing network including, without limitation, one or more hydrogenation, alkylation and/or catalytic cracking regions dedicated for a specific oil fraction, and further hydrogenation, alkylation and/or catalytic cracking regions for further respective specific oil fractions.

Although the present invention has been described in terms of specific exemplary embodiments, it will be appreciated that various modifications, alterations and/or combinations of features disclosed herein will be apparent to those skilled in the art without departing from the scope of the invention as set forth in the following claims.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. A method of monitoring a fluid processing network comprising a plurality of fluid processing regions, the method comprising the steps at a data processing system of:
   receiving measured current parameter values from sensors at known points of the fluid processing network;
   determining from the measured current parameter values fluid processing regions of the fluid processing network that are currently active, all other fluid processing regions being deemed inactive, thereby determining a current active fluid processing network;
   subtracting inactive fluid processing regions of the fluid processing network from a model of the fluid processing network to provide a current active fluid processing network model;
   determining current parameter values of the current active fluid processing network at least at points remote from the known points, the parameter values at said remote points being determined using the measured current parameter values and the current active fluid processing network model;
   based on the measured and the determined current parameter values, determining if one or more pre-specified boundaries are breached for any of the currently active fluid processing regions; and
   performing a predetermined action if one or more said boundaries are determined to be breached.

2. A method according to claim 1 wherein the current active fluid processing network model is periodically updated by the data processing system using periodically received updates of the current parameter values measured by the sensors in the fluid processing network.

3. A method according to claim 2 wherein inactive fluid processing regions that have become active, or active fluid processing regions that have become inactive, are determined from the updates of the current parameter values measured by the sensors in the fluid processing network.

4. A method according to claim 1 wherein parameter boundaries include any of predetermined constant boundaries; variable boundaries; or mathematical constraints derived from the values of one or more parameters.

5. A method according claim 1 wherein at least one predetermined risk is associated with a given parameter being outside a parameter boundary.

6. A method according to claim 1 wherein the predetermined action is selected from one or more of: issuing a notification to a network operator and issuing an instruction to an automated network control system.

7. A method according to claim 1 wherein current parameter values are determined for known points of the current active fluid processing network for which measured parameter values are received.

8. A method according to claim 7 wherein measured current parameter values for known points are replaced with the corresponding determined current parameter values for the same points in a manner that is consistent with the model of the fluid processing network.

9. A method according to claim 1 wherein one or more fluid processing components of the fluid processing network are each associated with two or more predetermined component models; wherein for each fluid processing component that is associated with two or more predetermined component models, one of the said two or more predetermined component models is selected for use in generating the model of the fluid processing network depending on at least one condition of the fluid processing network; and wherein one or more fluid processing components of the fluid processing network are associated with at least one component model that is used in generating a model for all conditions of the fluid processing network.

10. A method according to claim 9 wherein the at least one condition of the fluid processing network for determining the component model for a particular fluid processing component used in generating the model of the fluid processing network includes one or more of: one or more current parameter values of the fluid processing network; one or more anticipated future parameter values of the fluid processing network; and the presence of one or more chemical species in the fluid processing network and wherein the model is modified in response to a change in a condition of the fluid processing network that causes a change in the selection of component model used in generating the model.

11. A method according to claim 10 where the current parameter values are used as an initial point in conjunction with the model to predict the parameter values at a future point in time if (a) a set of predetermined changes is made to the settings of the fluid processing network over time, or if (b) no change is made to the current settings of the fluid processing network.

12. A method according to claim 11 wherein the model of the fluid processing network may be updated during a calculation of future behaviour via the subtraction of regions that become inactive and/or via the addition of regions that become active, such regions being determined automatically based on the predicted parameter values.

13. A method according to claim 11 wherein the model of the fluid processing network may be updated during a calculation of future behaviour via the selection of a different component model for one or more components among those components that are associated with more than one pre-determined component model, such selections being determined automatically based on the predicted parameter values.

14. A method according to claim 11 wherein the current behaviour of the fluid processing network and the future behaviour of the fluid processing network are determined via multiple simultaneous computations.

15. An article of manufacture comprising: a non-transitory machine-readable storage medium and executable program instructions embodied in the machine readable storage medium that when executed by a programmable data processing system causes the system to perform the steps in a fluid processing network of:
receiving measured current parameter values from sensors at known points of the fluid processing network;
determining from the measured current parameter values fluid processing regions of the fluid processing network that are currently active, all other fluid processing regions being deemed inactive, thereby determining a current active fluid processing network;
subtracting inactive fluid processing regions of the fluid processing network from a model of the fluid processing network to provide a current active fluid processing network model;
determining current parameter values of the current active fluid processing network at least at points remote from the known points, the parameter values at said remote points being determined using the measured current parameter values and the current active fluid processing network model;
based on the measured and the determined current parameter values, determining if one or more pre-specified boundaries are breached for any of the currently active fluid processing regions; and
performing a predetermined action if one or more said boundaries are determined to be breached.

16. A non-transitory storage medium carrying computer readable code which when run on a computer causes the computer to perform the steps in a fluid processing network of:
receiving measured current parameter values from sensors at known points of the fluid processing network;
determining from the measured current parameter values fluid processing regions of the fluid processing network that are currently active, all other fluid processing regions being deemed inactive, thereby determining a current active fluid processing network;
subtracting inactive fluid processing regions of the fluid processing network from a model of the fluid processing network to provide a current active fluid processing network model;
determining current parameter values of the current active fluid processing network at least at points remote from the known points, the parameter values at said remote points being determined using the measured current parameter values and the current active fluid processing network model;
based on the measured and the determined current parameter values, determining if one or more pre-specified boundaries are breached for any of the currently active fluid processing regions; and
performing a predetermined action if one or more said boundaries are determined to be breached.

17. A data processing system comprising a processor and memory for monitoring a fluid processing network comprising a plurality of fluid processing regions, the data processing system being configured to perform the steps in the fluid processing network of:

- receiving measured current parameter values from sensors at known points of the fluid processing network;
- determining from the measured current parameter values fluid processing regions of the fluid processing network that are currently active, all other fluid processing regions being deemed inactive, thereby determining a current active fluid processing network;
- subtracting inactive fluid processing regions of the fluid processing network from a model of the fluid processing network to provide a current active fluid processing network model;
- determining current parameter values of the current active fluid processing network at least at points remote from the known points, the parameter values at said remote points being determined using the measured current parameter values and the current active fluid processing network model;
- based on the measured and the determined current parameter values, determining if one or more pre-specified boundaries are breached for any of the currently active fluid processing regions; and
- performing a predetermined action if one or more said boundaries are determined to be breached.

* * * * *